United States Patent

[11] 3,586,395

| | | |
|---|---|---|
| [72] | Inventor | Paul J. Weaver<br>San Marino, Calif. |
| [21] | Appl. No | 811,953 |
| [22] | Filed | Apr. 1, 1969 |
| [45] | Patented | June 22, 1971 |
| [73] | Assignee | Automatic Control Systems, Inc.<br>El Monte, Calif. |

[54] BUILT-UP MACHINE TOOL SLIDE
2 Claims, 7 Drawing Figs.

[52] U.S. Cl. .................................... 308/3, 82/32
[51] Int. Cl. ............................... F16c 17/00, B23b 17/00
[50] Field of Search ........................... 82/32; 308/3, 3 A; 29/145

[56] References Cited
UNITED STATES PATENTS

| 1,540,132 | 6/1925 | Johannesmeyer et al. | 308/3 |
| 2,167,609 | 7/1939 | Dolle | 308/(3 UX) |
| 2,581,602 | 1/1952 | Pulsifier | 308/3 |

Primary Examiner—Manuel A. Antonakas
Attorney—Angus & Mon

ABSTRACT: A built-up machine tool slide assembly having a bed and a carriage. The carriage slides on rails mounted to the bed. The bearing surfaces are formed on separate parts which are assembled to form the structure. Adhesives may be used to join the parts.

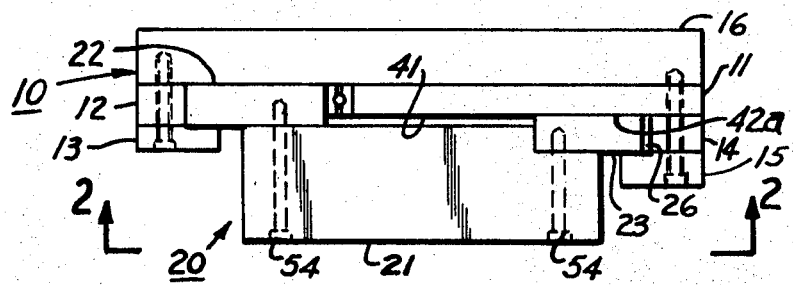
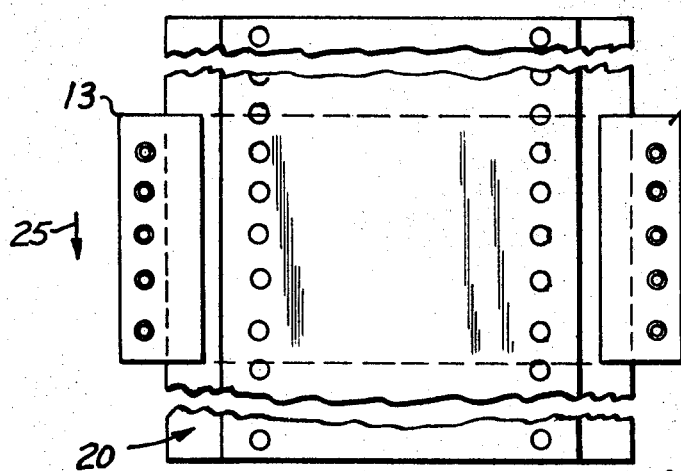
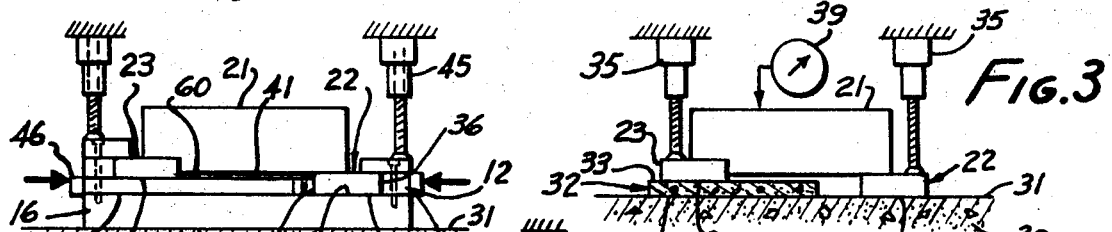
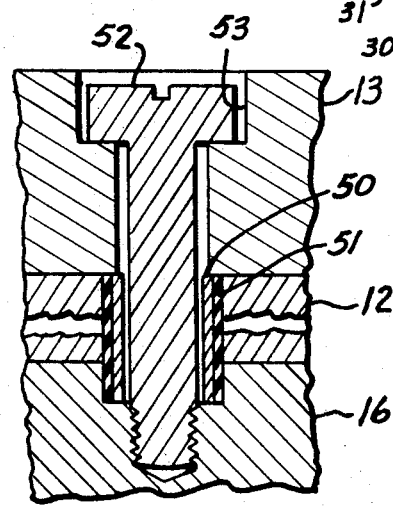
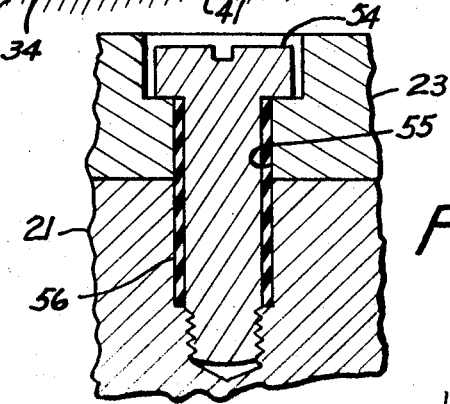
FIG. 1 FIG. 2 FIG. 3 FIG. 4 FIG. 5 FIG. 6 FIG. 7
INVENTOR.
PAUL J. WEAVER
ATTORNEYS.

BUILT-UP MACHINE TOOL SLIDE

This invention relates to a machine tool slide and to a method for making the same.

The troublesome procedures and expensiveness of manufacturing machine tool slides to close tolerances are well known. It is an object of this invention to provide a built-up machine tool slide assembly comprising a bed and a carriage which can be manufactured of a number of pieces all of which can be manufactured with simple milling and surface grinding equipment to a high degree of accuracy. The cost of manufacturing and assembling the structure is far below that of conventional devices of comparable accuracy.

A built-up slide assembly according to the invention comprises a bed and a carriage, the bed comprising a bed block and a first and second rail member attached to the bed block. The carriage includes a carriage block which bears two bearing surfaces against which the rails bear in true parallelism with each other. One of the rails includes a second bearing surface related to a rail spacer carried by the carriage block to give side support.

According to a preferred feature of the invention, the two reference surfaces on the latter of the two rails are square to each other and parallel to the same axis. The other of the rails bears a single surface in strict parallelism with one of the referenced surfaces on the first rail.

According to another preferred but optional feature of the invention, the assembly of major portions of this device is accomplished by adhesive means.

The above and other features of this invention will be fully understood from the following detailed description and the accompanying drawings in which:

FIG. 1 is an endwise elevation of the presently preferred embodiment of the invention;

FIG. 2 is a bottom view taken at line 2-2 of FIG. 1;

FIGS. 3, 4, and 5, are sequential assembly steps in the building of the device of FIG. 1; and FIGS. 6 and 7 are axial cross sections showing two classes of fasteners used to aid in holding the device in an assembled condition.

With initial reference to FIG. 1 there is shown a carriage 10 comprising a carriage spacer 11, a first rail spacer 12, a first rail retainer 13, a second rail spacer 14, and a second rail retainer 15, and a carriage block 16. The carriage spacer is optional, and is used when rails yet to be described are to be placed at different elevations. For the purpose of this invention, the carriage spacer may be considered a part of the carriage block. A gib 17 is integral with the carriage spacer.

A bed 20 includes a bed block 21, a first rail 22, and a second rail 23. It is evident that the bed block may be anchored to a machine tool structure, and that the carriage can then be shifted along the rails in the direction of axis 25. It should be evident from FIG. 1 that the rail retainers hold the carriage to the bed, and that the first rail will be the reference rail for controlling motion. In conventional use, the first rail will be disposed in a substantially vertical line and at a substantial elevation above the second rail, as would be seen if FIG. 1 were rotated 90° clockwise. Gap 26 exists between the second rail and the second rail spacer.

The details of construction of the elements already described will now be given with reference to the manner in which the device is constructed. With initial reference to FIG. 3, it will be noted that on a conventional surface plate 30 which has a truly flat surface 31 there is laid a master parallel plate 32 whose top and bottom surfaces 33, 34 are accurately parallel to each other. It therefore follows that surface 33 is parallel to surface 31. Now the rails will be attached to the bed block in the manner yet to be indicated. The use of the master parallel plate (and the carriage spacer) result in a stepwise relationship of the rails. If such an arrangement is not desired, the carriage spacer is deleted, and the spacer block is not used.

It is important to note that in the construction of the bed portion of this device at least several holddown clamps 35 are used along the length of the rails. Because these rails will customarily have been finished in grinding operations, it is to be expected that there will be residual stresses and the like which should be taken out of the rails at the time of assembly if a truly accurate slide is to be made. That is the purpose of the plurality of clamps. First rail 22 has been ground with its bearing surfaces 36 and 37 truly flat and at right angles to each other. Second rail 23 has a bearing surface 38 which also is truly flat. It will therefore be noted that bearing surfaces 37 and 38 are accurately parallel to each other. Also, bearing surface 38a bears against the gib and is accurately parallel to surface 36, as is the side of the gib.

The rails are now laid out, rail 22 on surface 31, and rail 23 on the master parallel plate. The master parallel plate forms no part of the slide assembly. It may be of ground stone, as is surface plate 30. The rails are generally axially aligned, although a true axial alignment of them is not essential to the slide assembly.

Next the bed block is placed atop the rails in the position shown and, utilizing a dial indicator 39 is shimmed into a level position relative to surface 31. At this time the bed block is lifted off and a coating of adhesive is applied to those surfaces of the rails which will be in contact with the bed block. Then the bed block will again be lowered into the adjusted position and will be retained there by its own weight while pressured is still being exerted on the rails by the screws until the adhesive hardens. This concludes the assembly of the bed. The heavy cross section of the bed block will prevent the rails from warping after they have been attached to it.

Next the carriage is assembled, and this is accomplished as initially shown in FIGS. 5 and 6. FIG. 5 shows carriage block 16 laid atop master parallel plate 32, which again rests atop surface 31. The carriage block is held in a cantilever condition by holddown screw 40. Next the carriage spacer 11 is slid in under the carriage block to its desired position. The carriage spacer is somewhat thinner than the master parallel and its surface 41 is truly flat. At this time the screw 40 is released, the carriage block lifted, and a layer of adhesive applied to surface 42 of the carriage spacer in sufficient quantity to fill the gap. This gap may be on the order of 0.010 inches in thickness. Then the carriage block is again lowered in place, screw 40 tightened down, and the carriage spacer with its gib attached becomes an integral part of the carriage block.

Next the carriage assembly is turned over and the bed is laid upon it with first rail 22 resting atop surface 42a of the carriage block, which surface was accurate ground flat in the manufacture of the carriage block and with surface 38 of the second rail resting atop surface 41 of the carriage spacer. Then first rail spacer 12 is generally aligned while being laid atop the carriage block. Temporary dowels (not shown) may be used to generally align the parts, and holddown screws 45 will be applied to clamp the assembly firmly against the carriage block. At this time clamps 46 are applied to insert a sidewise squeeze on the assembly so as to hold the carriage spacer, the first rail and the first rail spacer tightly together. The first rail spacer has been made to a very accurate thickness which is a few ten-thousandths of an inch thicker than the first rail. No adhesive is placed between the carriage block and the first rail spacer. Instead a plurality of devices as shown in FIG. 6 are utilized along the length to hold these two elements together. This device includes a bushing 50 around which adhesive 51 is placed. This will effectively hold the first rail spacer in place. Then the first rail retainer may be applied simply by laying it atop the first rail spacer and placing screw 52 in the hole. The screw bears against the base of a counterbore 53 so as to hold the rail in place. It will now be seen that the first rail retainer can be released by removing the screw, but that the first rail spacer itself is permanently attached by adhesive means to the carriage block.

Next, and with the optional use of another holddown screw, a similar construction can be made with the second rail spacer and the second rail retainer. A similar fastener is utilized for this purpose. However, gap 26 is left for clearance, and side clamping is not needed. Spacer 12 has an accurate sliding bearing surface. Spacer 14 has no sliding bearing surface.

Screws 54 are shown in FIG. 1 which aid in holding the rails to the bed block. These are the screws of FIG. 7 which are shown making a loose fit in hole 55 through the bed block and the rails. This region around the screws is filled with adhesive 56 and the joint is permanent, it being recognized that there will be no need to detach the rails from the bed block, while the rail retainers are removably attached because there may occur an event which would require the removal of the carriage from the bed.

The existence of gap 26 enables any departure from strict parallelism of the two rails to be accommodated by the device. The first rail is the accurate rail and all motion follows it. It is noted that surfaces 37 and 38 are in smooth abutment and strict parallelism, while surfaces 36, 38a are normal thereto, and that all three having matching surfaces whose flatness was obtained from a surface grinding operation and maintained by reference to a surface plate during assembly. There results from this construction, an inexpensive readily manufactured slide assembly of a higher order of accuracy than that which is currently attainable than even much more expensive constructions.

The presently preferred adhesive for use in this construction is that sold under the trademark Loctite, which is an adhesive which hardens in the absence of oxygen. It is to be understood however that other adhesives can perform as well and that the particular adhesive used is not a limitation on the invention. Neither is the use of an adhesive, although this is a convenient means of assembly. The dowels and screws could do the entire job of holding the device together, but then there would have to be closer tolerances in manufacture. With an adhesive, off-center holes and the like are tolerable because the fluid material will fill in the irregularities with strong material. For example, Loctite has compressive strength comparable to cast iron. The structure is therefore readily assembled with a minimum of tooling, tolerances, and expense.

Attention is called to spacing 60 between the carriage spacer and the bed block. This results from appropriate selection of rail thickness and the depth of the notch in which the second rail is seated. Such a clearance is helpful in maintaining the assembly in clean operating condition.

I claim:

1. A built-up slide assembly comprising a bed and a carriage which are relatively reciprocable along an axis, the bed comprising a bed block and a first and a second rail member attached to said bed block, the said first rail member having three-planar bearing surfaces which are parallel to the said axis and are normal to each other at a pair of dihedral angles located at opposite edges of one of said surfaces, the said second rail member having a planar-bearing surface which is parallel to one of the bearing surfaces on the first rail member, the carriage comprising a carriage block with planar-bearing surfaces in sliding contact with a bearing surface on each of the rail members, a first and a second rail spacer adjacent to each of the rail members, the first of said rail spacers having a thickness slightly greater than that of the first rail member and a bearing surface constituting one of the planar-bearing surfaces of the carriage block in sliding contact with one of the bearing surfaces thereon, a gib carried by the first rail spacer and bearing against the side of the first rail member opposite the first rail spacer, and a rail retainer detachably attached to each of said rail spacers and overhanging the respective rail member.

2. A built-up slide assembly according to claim 1 in which the rail members are adhesively attached to the bed block, and the rail spacer and the carriage spacer are adhesively attached to the carriage block.